United States Patent
Rabe et al.

(10) Patent No.: US 7,410,695 B2
(45) Date of Patent: Aug. 12, 2008

(54) SILOXANE BASED AMIDE MODIFIED NYLONS

(75) Inventors: Richard Rabe, LaCrosse, WI (US); William Blackwood, Midland, MI (US); Kimmai Nguyen, Midland, MI (US); Kevin Ryan, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 436 days.

(21) Appl. No.: 10/531,793

(22) PCT Filed: Oct. 24, 2003

(86) PCT No.: PCT/US03/33912

§ 371 (c)(1), (2), (4) Date: Apr. 18, 2005

(87) PCT Pub. No.: WO2004/037926

PCT Pub. Date: May 6, 2004

(65) Prior Publication Data

US 2006/0014906 A1    Jan. 19, 2006

Related U.S. Application Data

(60) Provisional application No. 60/421,037, filed on Oct. 24, 2002.

(51) Int. Cl.
*C08L 77/00* (2006.01)
*B32B 3/00* (2006.01)

(52) U.S. Cl. .................. 428/359; 57/200; 442/327; 525/432; 525/474

(58) Field of Classification Search ............... 525/432, 525/474; 428/359; 442/327; 57/200
See application file for complete search history.

(56) References Cited

U.S. PATENT DOCUMENTS

| | | | |
|---|---|---|---|
| 3,553,282 A * | 1/1971 | Holub | .......... 525/431 |
| 6,051,216 A | 4/2000 | Barr et al. | |
| 6,353,076 B1 | 3/2002 | Barr et al. | |
| 6,362,288 B1 | 3/2002 | Brewer et al. | |

FOREIGN PATENT DOCUMENTS

JP    7-270803    * 10/1995

* cited by examiner

*Primary Examiner*—Ana L Woodward
(74) *Attorney, Agent, or Firm*—Alan Zombeck

(57) ABSTRACT

Nylon compositions prepared by the melt mixing of a nylon thermoplastic resin and the siloxane based amide are disclosed. The modified nylons are useful in applications requiring nylons with increased hydrophobicity.

12 Claims, No Drawings

SILOXANE BASED AMIDE MODIFIED NYLONS

CROSS REFERENCES TO RELATED APPLICATIONS

The present application is a US national stage filing under 35 USC 371 and claims priority from PCT Application No. PCT/US03/33912 filed on Oct. 24, 2003, currently pending, which claims priority from U.S. 60/421,037 filed Oct. 24, 2002. The above identified applications are incorporated by reference in their entirety.

This invention provides nylon compositions that have been modified by the addition of a siloxane based amide. The modified nylons are prepared by the melt mixing of a nylon thermoplastic resin and the siloxane based amide. The modified nylons are useful in applications requiring nylons with increased hydrophobicity.

Polyamide based resins, or nylons, are an important class of thermoplastic resins in a variety of industries such as textiles, coatings, molded parts, etc. Numerous examples prevail in the art of various methods and techniques to improve the fundamental physical properties of nylons for certain applications. Typically, such improvements are based on the addition of certain components to the nylon, either during the processing of the nylon resin, or as a post additive. However, very often the addition of one component to a nylon resin, while improving one aspect or physical property, will negatively impact another aspect or physical property. In particular, there has been an interest to reduce the hydrophilic nature of nylons, especially in textile applications. Nylons having a reduced hydrophilic nature are expected to have less moisture pick up in fabrics, lower coefficient of frictions, improved softening, and improved water repellency. Furthermore, nylons having a reduced hydrophilic nature are expected to have benefits in the fiber processing and fiber weaving production process. For example, in the production of nylon fibers by extrusion, extruder pressure is expected to be reduced for nylon compositions having reduced hydrophilic nature resulting in easier processing, faster throughput, and ultimately lower costs. Nylons with reduced hydrophilic nature are expected to eliminate or reduce the need for sizing finishes in fiber weaving production.

Silicones, or organopolysiloxanes, have been used as additives in nylon compositions and processing to affect physical properties. Silicone fluids are common post-additives to nylon fibers for as lubricants for nylon spinning or weaving processes. Silicone fluids have been considered as additives during the production of nylon fibers to reduce the hydrophilic nature of the fibers, i.e., make them more hydrophobic. However, when silicone fluids, such as polydimethylsiloxanes, are added to nylons during fiber production, the silicone fluid can migrate within the nylon fiber and negatively impact certain physical properties. Thus, a need exists to modify nylon resins, and in particular nylon fibers, to increase their hydrophobicity without diminishing other physical properties.

The present inventors have discovered that when certain siloxane based polyamides are added to nylon compositions during processing, such as extrusion, the resulting nylon compositions are more hydrophobic than the unmodified nylons. Furthermore, other physical properties of the modified nylons were not impacted by the addition of the siloxane based polyamides in a negative manner.

U.S. Pat. No. 6,362,288 describes thermoplastic silicone elastomers from compatibilized polyamide resins. More specifically, U.S. Pat. No. 6,362,288 describes a method for preparing a thermoplastic elastomer comprising (I) mixing; (A) a Theologically stable polyamide resin, (B) a silicone base wherein the weight ratio of said silicone base to said polyamide resin is from 35:65 to 85:15, (C) for each 100 parts by weight of said polyamide resin, a compatibilizer, (D) an organohydrido silicon compound which contains an average of at least 2 silicon-bonded hydrogen groups in its molecule and (E) a hydrosilation catalyst, components (D) and (E) being present in an amount sufficient to cure said diorganopolysiloxane (B'); and (II) dynamically curing said diorganopolysiloxane (B'). U.S. Pat. No. 6,362,288 teaches that the compatibilizer (C) may be selected from siloxane based polyamides.

The present invention provides a thermoplastic resin composition comprising at least 80% of a reaction product resulting from the melt mixing of;

A) a nylon thermoplastic resin, and

B) a siloxane modified amide having the formula;

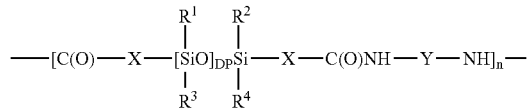

where, (1) DP (degree of polymerization) is 1-700, (2) n is 1-500, (3) X is a linear or branched chain alkylene having 1-30 carbons, (4) Y is a linear or branched chain alkylene having 1-40 carbons, wherein, (a) the alkylene group may optionally and additionally contain in the alkylene portion at least one of (i) 1-3 amide linkages; (ii) a C5 or C6 cycloalkane; or (iii) phenylene, optionally substituted by 1-3 members which are independently C1-C3 alkyls;

(b) the alkylene group itself may optionally be substituted by at least one of (i) hydroxy; (ii) a C3-C8 cycloalkane; (iii) 1-3 members which are independently C1-C3 alkyls; phenyl, optionally substituted by 1-3 members which are independently C1-C3 alkyls; (iv) a C1-C3 alkyl hydroxy; or (v) a C1-C6 alkyl amine;

(c) Y can be Z where Z is $T(R^{20})(R^{21})(R^{22})$ where $R^{20}$, $R^{21}$ and $R^{22}$ are each independently linear or branched C1-C10 alkylenes; and T is CR in which R is hydrogen, the group defined for $R^1$-$R^4$, or a trivalent atom such as N, P and Al;

(5) each of $R^1$-$R^4$ is independently methyl, ethyl, propyl, isopropyl, a siloxane chain, or phenyl, wherein the phenyl may optionally be substituted by 1-3 members, which are methyl or ethyl; and (6) X, Y, DP, and $R^1$-$R^4$ may be the same or different for each polyamide unit.

The present invention also relates to a process for preparing a thermoplastic resin composition comprising melt mixing;

A) a nylon thermoplastic resin, and

B) a siloxane modified amide having the formula described supra.

The present invention further relates to a method for increasing the hydrophobicity of a nylon thermoplastic resin comprising adding a siloxane modified amide having the formula described supra as a melt additive to a nylon thermoplastic resin.

The thermoplastic nylon compositions can be extruded and blown into sheet products or molded or cast into articles of manufacture. Likewise, they can be drawn into fiber and made into nonwoven fabrics or spun to produce yarns from which fabrics may be woven. Such articles of manufacture based on the present compositions and methods are also related to the present invention.

Component (A) of the present invention is a thermoplastic nylon resin. Nylon resin (A) can be any high molecular weight solid homopolymer, copolymer or terpolymer having recurring amide units within the polymer chain (i.e. polyamides) having thermoplastic properties. The nylon resin can be either crystalline or amorphous. Typically, the nylon resin has a melt point (m.p.), or glass transition temperature ($T_g$) if the nylon is amorphous, greater than 25° C. In copolymer and terpolymer systems, more than 50 mole percent of the repeat units are amide-containing units. Examples of suitable polyamides are polylactams such as nylon 6, polyenantholactam (nylon 7), polycapryllactam (nylon 8), polylauryllactam (nylon 12), and the like; homopolymers of aminoacids such as polypyrrolidinone (nylon 4); copolyamides of dicarboxylic acid and diamine such as nylon 6/6, polyhexamethyleneazelamide (nylon 6/9), polyhexamethylene-sebacamide (nylon 6/10), polyhexamethyleneisophthalamide (nylon 6,I), polyhexamethylenedodecanoic acid (nylon 6/12) and the like; aromatic and partially aromatic polyamides; copolyamides such as copolymers of caprolactam and hexamethyleneadipamide (nylon 6,6/6), or a terpolyamide (e.g., nylon 6,6/6,6); block copolymers such as polyether polyamides; or mixtures thereof. Preferred polyamide resins are nylon 6, nylon 12, nylon 6/12 and nylon 6/6.

The siloxane-based polyamides useful as components in the thermoplastic compositions of the present invention comprises a unit represented by the following formula:

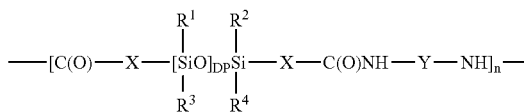

where:

(1) DP (degree of polymerization) is 1-700, alternatively 10-500, or alternatively 15-100. DP represents an average value for degree of polymerization of the siloxane units in the polymer with greater or lesser DP values centered around the indicated DP value.

(2) n is 1-500, alternatively 1-100, or alternatively 4-25.

(3) X is a linear or branched chain alkylene having 1-30 carbons, typically 3-10 carbons, or alternatively 10 carbons.

(4) Y is a linear or branched chain alkylene having 1-40 carbons, alternatively 1-20 carbons, alternatively 2-6 carbons, or alternatively 6 carbons wherein (a) the alkylene group may optionally and additionally contain in the alkylene portion at least one of (i) 1-3 amide linkages; (ii) a C5 or C6 cycloalkane; or (iii) phenylene, optionally substituted by 1-3 members which are independently C1-C3 alkyls; and (b) the alkylene group itself may optionally be substituted by at least one of (i) hydroxy; (ii) a C3-C8 cycloalkane; (iii) 1-3 members which are independently C1-C3 alkyls; phenyl, optionally substituted by 1-3 members which are independently C1-C3 alkyls; (iv) a C1-C3 alkyl hydroxy; or (v) a C1-C6 alkyl amine; and (c) Y can be Z where Z is $T(R^{20})(R^{21})(R^{22})$ where $R^{20}$, $R^{21}$ and $R^{22}$ are each independently linear or branched C1-C10 alkylenes; and T is CR in which R is hydrogen, the group defined for $R^1$-$R^4$, or a trivalent atom such as N, P and Al.

(5) each of $R^1$-$R^4$ (collectively "R") is independently methyl, ethyl, propyl, isopropyl, a siloxane chain, or phenyl, wherein the phenyl may optionally be substituted by 1-3 members, which are methyl or ethyl. More particularly, $R^1$-$R^4$ are methyl or ethyl, especially methyl.

(6) X, Y, DP, and $R^1$-$R^4$ may be the same or different for each polyamide unit.

Also, the polyamides must have a siloxane portion in the backbone and optionally may have a siloxane portion in a pendant or branched portion.

Representative examples of siloxane-based polyamides useful in the compositions of the present invention are disclosed in U.S. Pat. No. 6,051,216 and U.S. Pat. No. 6,353,076 B1, which are hereby incorporated by reference.

The compositions of the present invention can be prepared by melt mixing the siloxane based amide (3) with the nylon resin (A). Typically, the nylon resin is first melted and then the siloxane based amide is mixed with the nylon melt. The mixing can occur via any known mixing techniques in the art for processing and mixing thermoplastic resins at elevated temperatures. For example, components (A) and (B) may be mixed in a twin screw extruder, a Banbury mixer, a two roll mill or a single screw extruder, either with or without a mixing gear. Typically, the mixing occurs using an extrusion process, and preferably using a twin screw extruder.

The amount of the siloxane based amide used per 100 parts of the nylon resin is typically 0.1 to 20 weight parts of B) per 100 weight parts of A), alternatively 10 to 20 weight parts of B) per 100 weight parts of A), alternatively 0.5 to 10 weight parts of B) per 100 weight parts of A), or alternatively 0.5 to 5 weight parts of B) per 100 weight parts of A).

The compositions of the present invention comprise the reaction product obtained from the melt mixing of components (A) and (B). The compositions are characterized as comprising at least 80 weight %, alternatively 90 weight %, or alternatively 95 weight % of the reaction product. Other components, such as those commonly added to nylon compositions or processes, can be added to the melt mixture, providing these additional components are not equal to or exceed 20 weight percent of the total composition. These other components include, but not limited to, processing additives, fillers, flame retardants, u.v. stabilizers, antioxidants, antiblock agents, catalyst stabilizers, lubricants, colorants, impact modifiers, foaming agents, mold release agents, matt/gloss additives and plasticizers.

It is possible to obtain a relatively uniform dispersion by injecting component (B) into the screw section of an extruder while nylon pellets are fed in through the hopper thereof. An alternative method of mixing can be used whereby component (B) is first dispersed in a portion of component (A) to form a masterbatch. This masterbatch (or concentrate), which preferably contains 1 to 50, more preferably 20 to 50, weight percent of the siloxane based amide (B), may be ground up or pelletized, the resulting particulate dry-blended with additional nylon resin and this blend then extruded or injected to form a composition of the invention. Use of this masterbatch technique can result in a more uniform dispersion of the siloxane based amide in the nylon resin.

The compositions of the present invention can be further compounded or mixed with additional components. These additional components can be illustrated by, but not limited to, reinforcing fillers for polyamide resins, such as glass fibers and carbon fibers; extending fillers such as quartz, calcium carbonate, and diatomaceous earth; pigments such as iron oxide and titanium oxide, electrically conducting fillers such as carbon black and finely divided metals, heat stabilizers such as hydrated cerric oxide, antioxidants, flame retardants such as halogenated hydrocarbons, alumina trihydrate, magnesium hydroxide, organophosphorous compounds and other fire retardant (FR) materials The composition produced in accordance with the present invention can have many applications. For instance, the thermoplastic nylon compositions can be extruded and blown into sheet products or molded or cast into articles of manufacture. Likewise, they can be drawn into fiber and made into non-woven fabrics or spun to produce yarns from which fabrics may be woven.

EXAMPLES

Silicone-polyamide copolymers were prepared according to the methods described in U.S. Pat. Nos. 5,981,680, and 6,051,216 having the following formula:

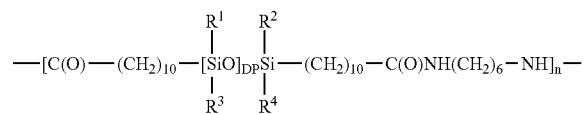

where R1, R2, R3 and R4 are methyl. The degree of polymerization (DP) of the siloxane units and resulting molecular weights (weight average) are defined in Table 1. The molecular weights of the silicone-polyamide copolymers were measured using Gel Permeation Chromatography.

TABLE 1

Silicone-polyamide Copolymers

| | Copolymer # | | | |
|---|---|---|---|---|
| | #1 | #2 | #3 | #4 |
| Siloxane DP | 15 | 15 | 45 | 100 |
| Molecular weight | 125,100 | 125,100 | 85,600 | 96,260 |
| Solvent type | PPG 3 - myristyl ether | Not applicable | Not applicable | Not applicable |
| Solvent amount | 12% | 0% | 0% | 0% |

In the following, specific examples of thermoplastic systems and associated articles within the scope of the present invention are also set forth. These specific thermoplastic system examples are illustrative in connection with the present invention, and are not limiting. While particular siloxane-based polyamides are disclosed or used in the following Examples, it is to be understood that other siloxane-based polyamides (for example, those made with a purified siloxane diacid, di-anhydride, diesters, or diacid chloride) may also be used and are within the spirit and scope of the invention.

Example 1

Extruded plaques were formed by doping 1% silicone-polyamide copolymer #1 (Ref: 2), 4% of silicone-polyamide copolymer #1 (ref: 3), 1% of silicone-polyamide copolymer #2 (ref:5), 3% of silicone-polyamide copolymer #2 (ref: 6) and 5% of silicone-polyamide copolymer #2 (ref: 7) to a nylon 6,6 melt and mixed by an extrusion process via a 24 mm twin screw extruder operating at 300 rpm and 270° C. Control extruded plaques of polyamide (nylon) 6,6 were also formed for each set which contained no silicone-polyamide copolymer (ref:1 & 4). Results in Table #2 show a decrease in surface tension and increase in water contact angle when the silicone-polyamide copolymers are incorporated.

TABLE 2

Effect of Silicone-polyamide copolymer on surface properties

| | Reference | | | | | | |
|---|---|---|---|---|---|---|---|
| | 1 | 2 | 3 | 4 | 5 | 6 | 7 |
| Silicone-polyamide copolymer (#) | N/A | 1 | 1 | N/A | 2 | 2 | 2 |
| Silicone-polyamide copolymer amount (%) | 0 | 1 | 4 | 0 | 1 | 3 | 5 |
| Surface Energy dyne/cm ($\times 10^{-7}$ N · m) | 45.1 | 42.1 | 24.1 | 45.1 | 42.1 | 29.4 | 24.1 |
| Water Contact Angle (degree) | 74 | 86 | 87 | 67 | 71 | 85 | 91 |

Example 2

A fiber comprised of polyamide (nylon) 6,6 containing 2% silicone-polyamide copolymer #2 incorporated prior to extrusion and a control polyamide (nylon) 6,6 fiber containing no silicone-polyamide copolymer were formed. No lubricating spin finish was applied to the yarns. Table #3 shows the dynamic water contact angle as well as the extractable content of the fibers after refluxing in isopropanol. Extractables were analyzed by Electron Spray Ionization (ESI) and Gel Permeation Chromatography (GPC). Results show that the silicone-polyamide copolymer was effective at reducing dynamic contact angle and cannot be removed by extraction as a topically applied spin finish would be.

TABLE 3

Dynamic water contact angle and extractable results

| | | |
|---|---|---|
| Silicone-polyamide copolymer (#) | N/A | 2 |
| Silicone-polyamide copolymer amount (%) | 0 | 2 |
| Dynamic Contact Angle (degrees) | 78.0 | 84.8 |
| ESI (atomic mass units, amu) | No detectable species at <800 amu | No detectable species at <800 amu |
| GPC | No detectable species | No detectable species |

Example 3

Separate extruded yarns of polyamide (nylon) 6,6 were formed by doping 1% silicone-polyamide copolymer #1 (ref: 2), 2% of silicone-polyamide copolymer #1 (ref: 3) and 2% of silicone-polyamide copolymer #2 (ref:4) prior to extrusion. Control extruded yarn of polyamide (nylon) 6,6 containing no silicone-polyamide copolymer was also formed (ref: 1). Properties of undrawn yarn without a lubricating spin finish applied are shown in Table #4. Results show that the physical properties are not negatively impacted by incorporation of the silicone-polyamide copolymers.

TABLE 4

Physical property assessment of Nylon 6,6
containing silicone-polyamide copolymer

| | Reference: | | | |
|---|---|---|---|---|
| | 1 | 2 | 3 | 4 |
| Silicone-polyamide copolymer (#) | N/A | 1 | 1 | 2 |
| Silicone-polyamide copolymer amount (%) | 0 | 1 | 2 | 2 |
| Elongation (%) | 411 | 411 | 433 | 439 |
| Tenacity (cN/tex) | 12.9 | 13.0 | 13.3 | 12.9 |

The invention claimed is:

1. A thermoplastic resin composition comprising at least 80% of a reaction product resulting from the melt mixing of;
A) a nylon thermoplastic resin, and
B) a siloxane modified amide having the formula;

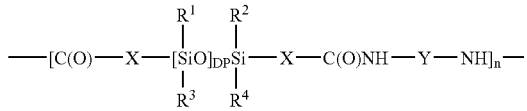

where,
(1) DP (degree of polymerization) is 1-700,
(2) n is 1-500,
(3) X is a linear or branched chain alkylene having 1-30 carbons,
(4) Y is a linear or branched chain alkylene having 1-40 carbons,
wherein,
(a) the alkylene group may optionally and additionally contain in the alkylene portion at least one of (i) 1-3 amide linkages; (ii) a C5 or C6 cycloalkane; or (iii) phenylene, optionally substituted by 1-3 members which are independently C1-C3 alkyls;
(b) the alkylene group itself may optionally be substituted by at least one of (i) hydroxy; (ii) a C3-C8 cycloalkane; (iii) 1-3 members which are independently C1-C3 alkyls; phenyl, optionally substituted by 1-3 members which are independently C1-C3 alkyls; (iv) a C1-C3 alkyl hydroxy; or (v) a C1-C6 alkyl amine;
(c) Y can be Z where Z is $T(R^{20})(R^{21})(R^{22})$ where $R^{20}$, $R^{21}$ and $R^{22}$ are each independently linear or branched C1-C10 alkylenes; and T is CR in which R is hydrogen, the group defined for $R^1$-$R^4$, or a trivalent atom such as N, P and Al;
(5) each of $R^1$-$R^4$ is independently methyl, ethyl, propyl, isopropyl, a siloxane chain, or phenyl, wherein the phenyl may optionally be substituted by 1-3 members, which are methyl or ethyl; and
(6) X, Y, DP, and $R^1$-$R^4$ may be the same or different for each polyamide unit.

2. The thermoplastic resin composition of claim 1 wherein 0.5 to 20 weight parts of B) is used per 100 weight parts of A).

3. The thermoplastic resin composition of claim 1 wherein 20 to 50 weight parts of B) is used per 100 weight parts of A).

4. The thermoplastic resin composition of claim 1 wherein the nylon thermoplastic resin is selected from the group of nylon 6, nylon 6/6, nylon 6/12 nylon 12, and mixtures thereof.

5. A process for preparing a thermoplastic resin composition comprising melt mixing;
A) a nylon thermoplastic resin, and
B) a siloxane modified amide having the formula;

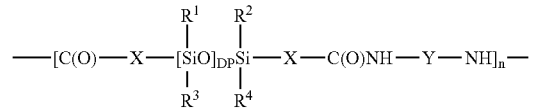

where,
(1) DP (degree of polymerization) is 1-700,
(2) n is 1-500,
(3) X is a linear or branched chain alkylene having 1-30 carbons,
(4) Y is a linear or branched chain alkylene having 1-40 carbons,
wherein,
(a) the alkylene group may optionally and additionally contain in the alkylene portion at least one of (i) 1-3 amide linkages; (ii) a C5 or C6 cycloalkane; or (iii) phenylene, optionally substituted by 1-3 members which are independently C1-C3 alkyls;
(b) the alkylene group itself may optionally be substituted by at least one of (i) hydroxy; (ii) a C3-C8 cycloalkane; (iii) 1-3 members which are independently C1-C3 alkyls; phenyl, optionally substituted by 1-3 members which are independently C1-C3 alkyls; (iv) a C1-C3 alkyl hydroxy; or (v) a C1-C6 alkyl amine;
(c) Y can be Z where Z is $T(R^{20})(R^{21})(R^{22})$ where $R^{20}$, $R^{21}$ and $R^{22}$ are each independently linear or branched C1-C10 alkylenes; and T is CR in which R is hydrogen, the group defined for $R^1$-$R^4$, or a trivalent atom such as N, P and Al;
(5) each of $R^1$-$R^4$ is independently methyl, ethyl, propyl, isopropyl, a siloxane chain, or phenyl, wherein the phenyl may optionally be substituted by 1-3 members, which are methyl or ethyl; and
(6) X, Y, DP, and $R^1$-$R^4$ may be the same or different for each polyamide unit,
wherein the thermoplastic resin composition contains at least 80 weight percent of A) and B).

6. An article of manufacture comprising a sheet product made from the composition of claim 1.

7. An article of manufacture comprising a molded article made from the composition of claim 1.

8. An article of manufacture comprising a fiber made from the composition of claim 1.

9. An article of manufacture in accordance with claim 8 comprising a spun yarn made from said fiber.

10. An article of manufacture in accordance with claim 9 comprising a textile woven from said spun yarn.

11. An article of manufacture in accordance with claim 8 comprising a nonwoven fabric made from said fiber.

12. An article of manufacture comprising the composition of claim 1.

* * * * *